(12) United States Patent
Kappel

(10) Patent No.: US 7,495,846 B1
(45) Date of Patent: Feb. 24, 2009

(54) ADJUSTABLE COMPUTER MONITOR OPTICAL DEVICE

(75) Inventor: Herman Kappel, Lawrence, NY (US)

(73) Assignee: Kantek, Inc., Oceanside, NY (US)

( * ) Notice: Subject to any disclaimer, the term of this patent is extended or adjusted under 35 U.S.C. 154(b) by 0 days.

(21) Appl. No.: 11/519,513

(22) Filed: Sep. 12, 2006

(51) Int. Cl.
*G02B 27/02* (2006.01)
(52) U.S. Cl. ..................................... 359/802
(58) Field of Classification Search ............... 359/802; 348/63, 561, 818–835; D16/134, 135
See application file for complete search history.

(56) References Cited

U.S. PATENT DOCUMENTS

| | | | | |
|---|---|---|---|---|
| 4,712,870 A | * | 12/1987 | Robinson et al. | ............ 359/738 |
| D298,250 S | * | 10/1988 | Kildall | ...................... D14/450 |
| 5,227,916 A | | 7/1993 | Theirl | |
| 5,719,645 A | * | 2/1998 | Saito et al. | .................. 348/818 |
| 5,971,548 A | | 10/1999 | Hung | |
| 6,050,833 A | | 4/2000 | Danzyger | |
| 6,151,083 A | | 11/2000 | Hung | |
| 6,750,922 B1 | * | 6/2004 | Benning | ...................... 348/818 |
| D504,899 S | * | 5/2005 | Ellis et al. | .................. D14/450 |
| 7,226,176 B1 | * | 6/2007 | Huang | ......................... 359/609 |
| 2008/0030631 A1 | * | 2/2008 | Gallagher | .................... 348/818 |

* cited by examiner

*Primary Examiner*—Jessica T Stultz
*Assistant Examiner*—Mahidere S Sahle
(74) *Attorney, Agent, or Firm*—Schweitzer Cornman Gross & Bondell LLP

(57) ABSTRACT

An adjustable optical device for a computer monitor having an optical surface such as a magnifying lens or glare filter, and a pair of upper and lower arms. The upper arms retain the optical device to the monitor by having a rearwardly extending portion that rest on top of the monitor and downwardly extending ends that extend behind the back of the monitor. The lower arms swivel horizontally around a vertical axis. The lower arms have ends which rest against a front surface of the monitor. The vertical position of the lower arms is adjustable by sliding a portion of the arms into a retainer and securing the position therein by fastening a tightening knob. The space between the magnifier and the monitor and the angle of the monitor relative to the screen are adjusted by swiveling the lower arms.

25 Claims, 4 Drawing Sheets

ADJUSTABLE COMPUTER MONITOR OPTICAL DEVICE

FIELD OF THE INVENTION

This invention relates generally to an adjustable optical device for a computer monitor which is easily mounted onto a monitor in a secure manner and provides improved adjustability of the position of the optical device relative to the monitor.

BACKGROUND OF THE INVENTION

Various adjustable optical devices having a plurality of arms or brackets have been used for placement with respect to a computer monitor in order to magnify or filter the image on the monitor. However, many of these devices are difficult to mount or are not vertically adjustable or adjustable in respect to the distance between the accessory and the monitor and the angle of the accessory relative to the monitor. For instance, U.S. Pat. No. 6,151,083 to Hung is directed to a monitor filter that has a pair of upper arms that screw into the filter frame to allow the user to adjust the vertical height of the filter. The Hung device does not enable the user to adjust the space between the filter and the monitor and the angle of the filter relative to the monitor.

U.S. Pat. No. 6,050,833 to Danzyger teaches a monitor filter that is vertically adjustable and is pivotally connected to its housing to allow the user to adjust the angle relative to the monitor. While the Danzyger device allows both vertical adjustment and changes to the angle of the filter relative to the monitor, this device does not allow the user to adjust the distance between the monitor and the accessory. The distance that the screen extends from the monitor is particularly important for monitor magnifiers because the size and clarity of the image are affected by the proximity of the magnifier to both the viewer and the screen. Furthermore, the Danzyger device requires frictional resistance between housing elements comprising a support and frame in order to effectively maintain its angle relative to the monitor. This frictional securement can degrade over time and the required housing renders the Danzyger device a more complex and expensive article to manufacture.

Accordingly, it is an object of the present invention to provide an optical device, such as a magnifier, for a monitor that is vertically adjustable and can also be adjusted to change the distance between the monitor and the optical device and the angle of the optical device relative to the monitor.

Yet another object of the present invention is to provide an optical device that is easily mounted onto a monitor.

It is another object of the present invention to provide an optical device for a monitor that is efficient and cost effective to manufacture.

SUMMARY OF THE INVENTION

The foregoing and other objects and purposes are met by the present invention directed to an improved computer monitor optical device and particularly to a monitor magnifier. The computer monitor optical device features a pair of upper arms which allows the user to easily install the optical device and provides a secure mounting of the optical device on the monitor. The upper arms have a first portion that is secured to a frame that supports the optical surface of the optical device, such as a magnifier lens. The upper arms also have a rearwardly extending portion that rests on the top of the monitor, and may have an end portion that extends downwardly behind the back of the monitor for further retention of the optical device to the monitor. The upper arms preferably also features adjustment means wherein the upper arms can be moved up or down and can swivel with respect to the frame and optical surface.

The optical device also has a pair of lower arms that have a first portion secured to the frame, a rearwardly extending portion, and an end portion that rests against the front side of the monitor. The lower arms swivel in an arc around a vertical axis. By adjusting the position of the lower arms, the user can easily adjust the spacing between the optical device and the monitor and alter the angle of the monitor relative to the screen. As the lower arm ends are swiveled away from the monitor, the active element, such as the magnifier lens, is moved closer to the monitor. When the lower arm ends are swiveled towards the monitor, the magnifier lens is moved away from the monitor. The lower arms also features vertical adjustment means wherein the lower arms can be moved up or down with respect to the frame.

DESCRIPTION OF THE DRAWINGS

The above and other objects, features and advantages of the present invention will become apparent from the following description of a preferred but, nonetheless, illustrative embodiment of the invention, taken in conjunction with the accompanying drawings, wherein FIG. 1 provides a rear view of a monitor optical device in accordance with this invention.

DETAILED DESCRIPTION OF PREFERRED EMBODIMENTS

Figure 1:
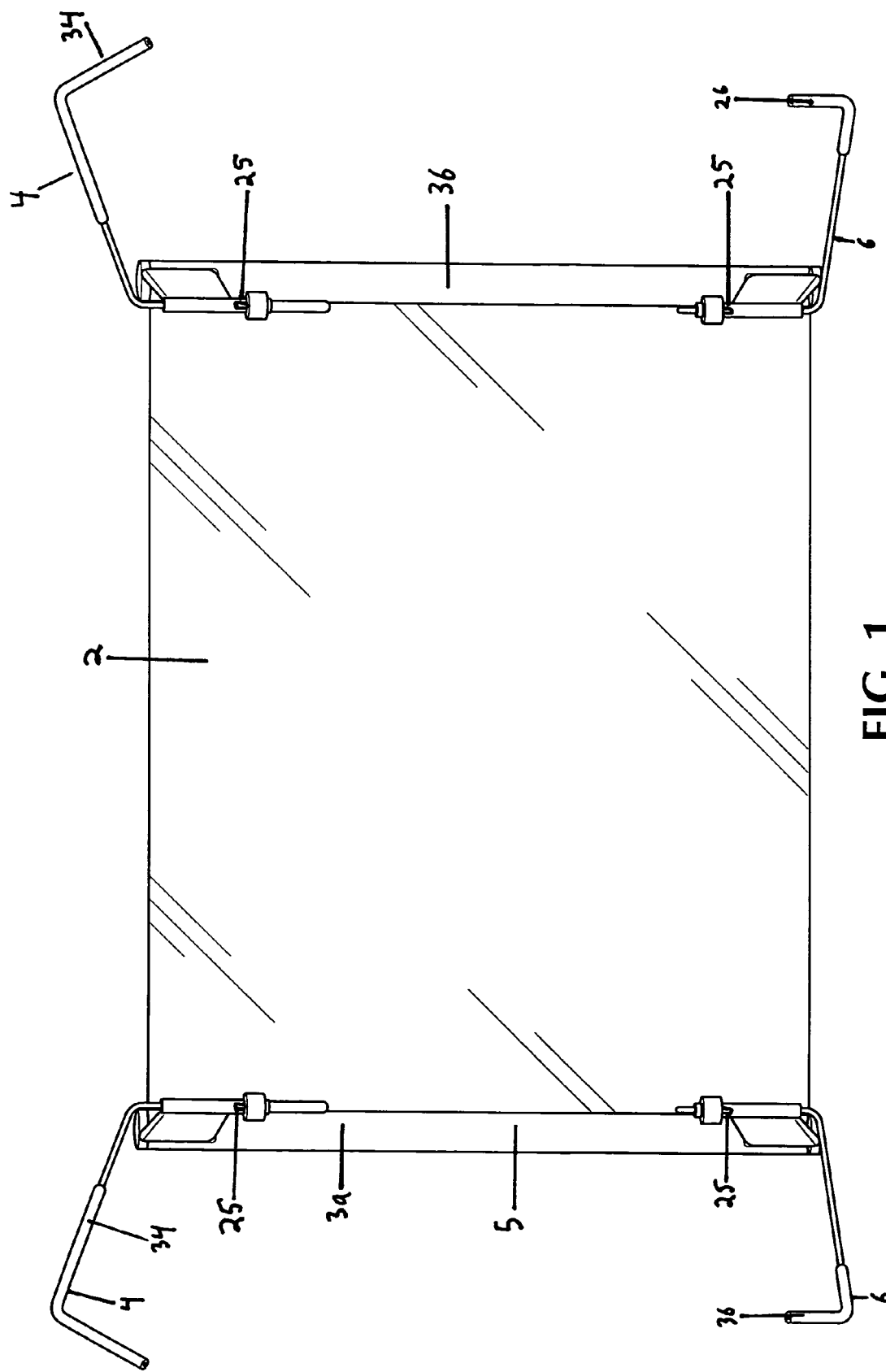
Figure 2A:
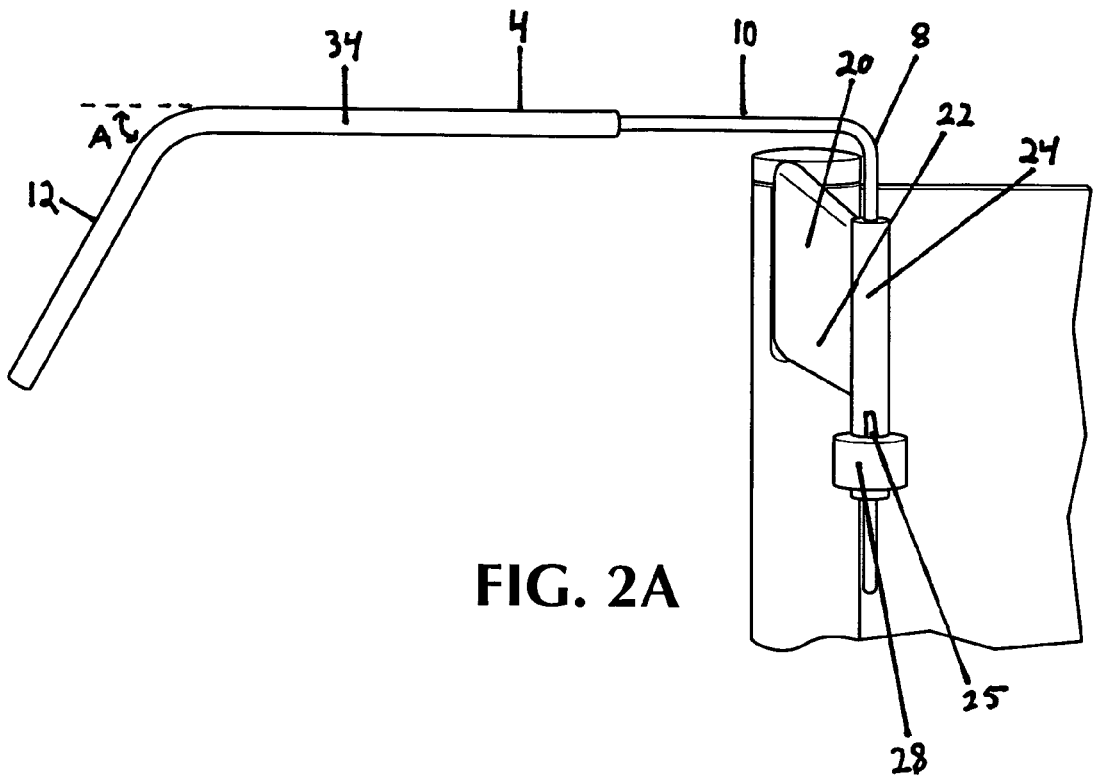
FIG. 2A provides an enlarged view of an upper arm of the monitor optical device.
Figure 2B:
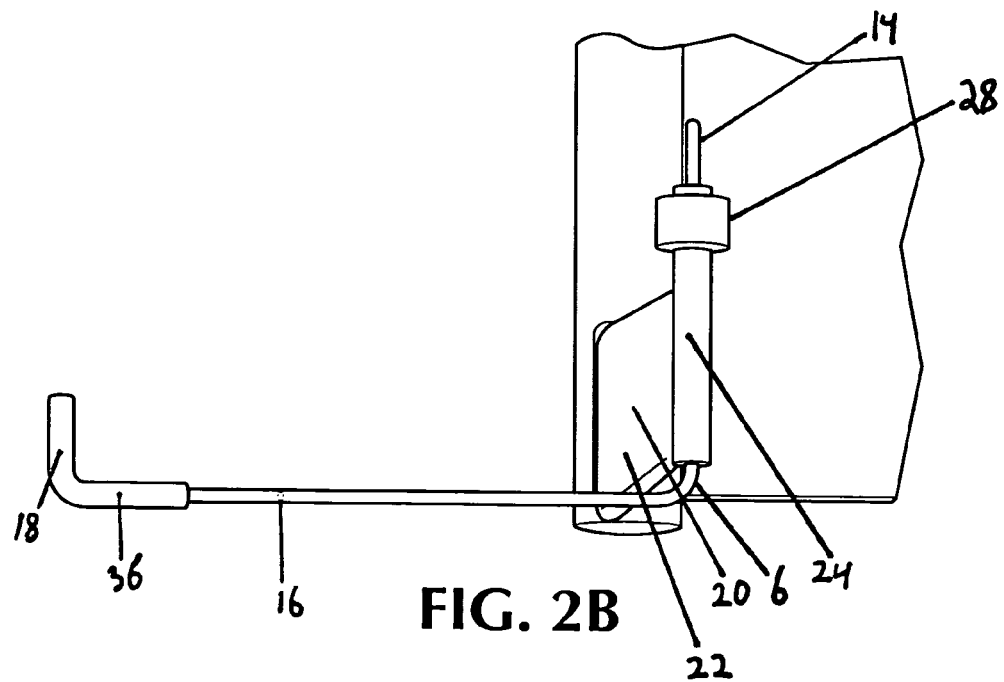
FIG. 2B provides an enlarged view of a lower arm of the monitor optical device.
Figure 3:
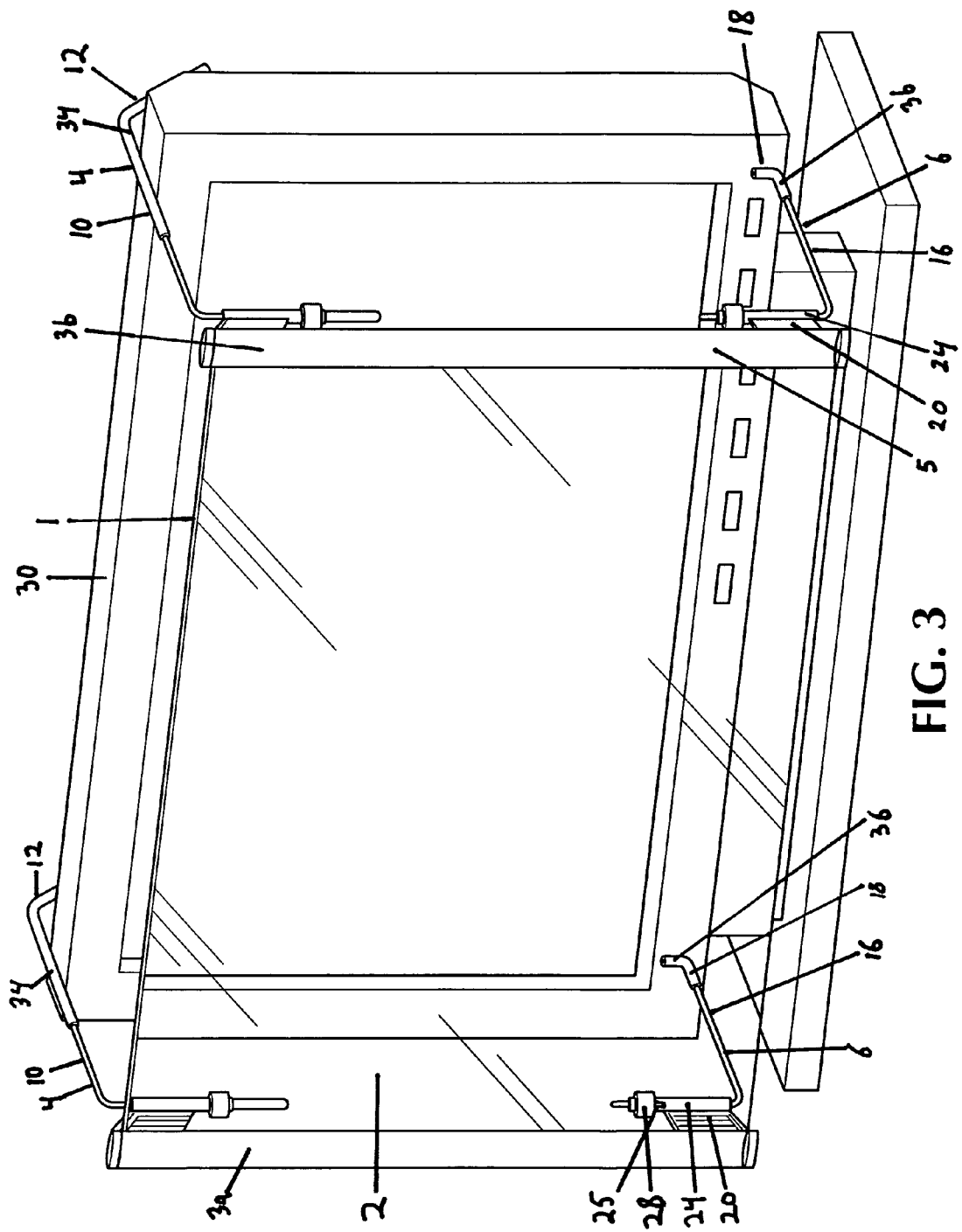
FIG. 3 provides a perspective view of the optical device mounted on a monitor.
Figure 4:
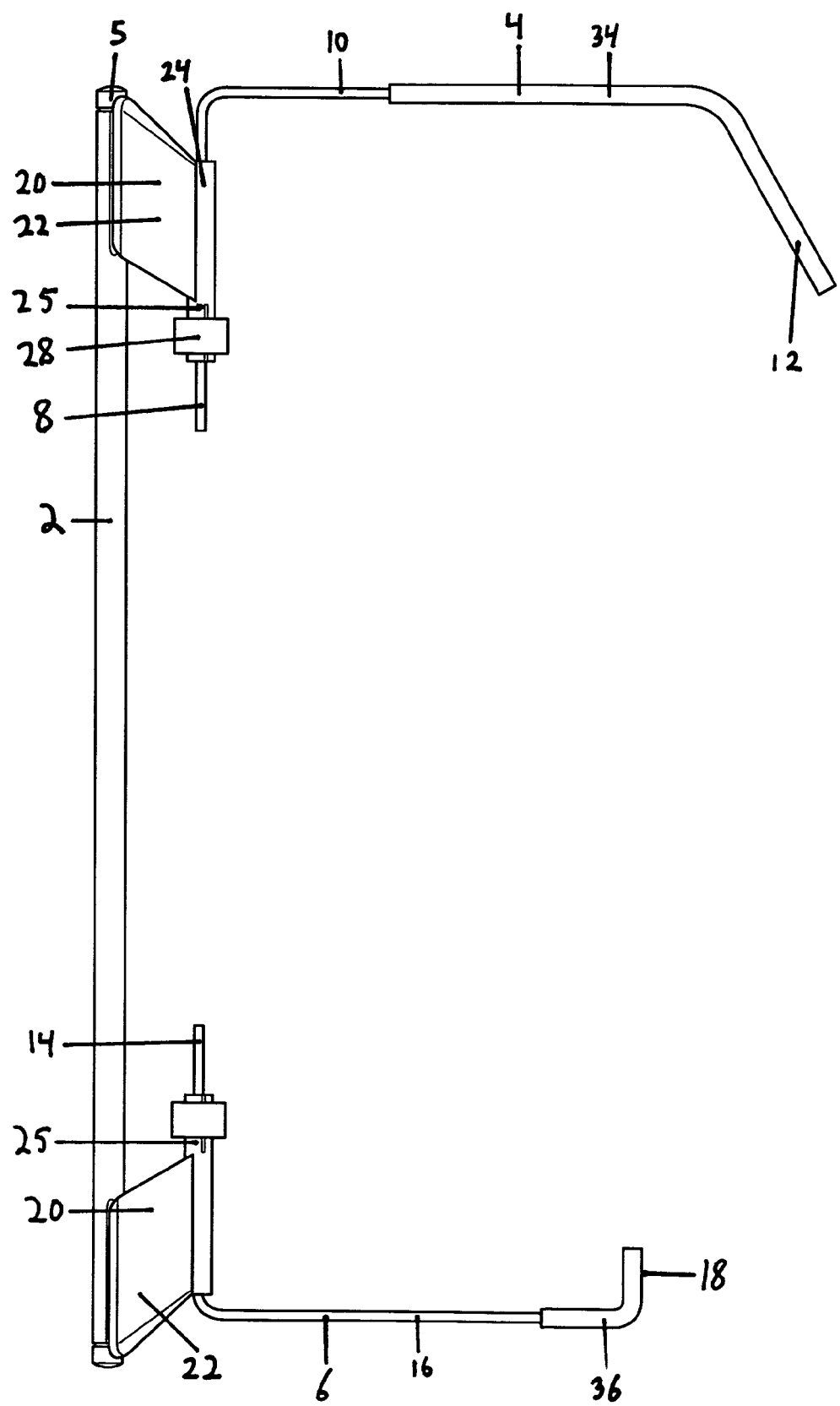
FIG. 4 provides a side elevational view of the optical device.

With particular reference to the drawings, the present invention is directed to an improved computer monitor optical device, such as a light filter or magnifier. FIG. 1 illustrates an optical device 1 having an optical surface 2, lateral frame elements 3a and 3b on the left and right side, respectively, of the optical device together forming frame 5, and a pair of preferably movable upper arms 4 and lower arms 6 attached to the frame 5 for mounting the optical device and adjusting its position relative to the monitor. For purposes of clarity, FIG. 1 shows the arms 4 and 6 splayed outwardly beyond their normal mounting position as illustrated in FIG. 3. In the embodiment shown, the optical surface 2 is a magnifying lens or filter. The optical surface 2 may be made out of plastic, glass or other materials as appropriate as known in the art. The optical surface 2 may be rectangular, square or another appropriate shape. In the embodiment shown, individual frame elements 3a, 3b are on the left and right side of the optical surface 2. Alternatively, individual frame elements 3a, 3b may be positioned on the top and bottom of the optical surface 2 or on all four sides.

With reference to FIG. 24, the upper arms 4 are adapted to be placed over the top of a monitor 30 to allow for an easy and secure mounting of the optical device 1 to the monitor. Each of the upper arms has a generally vertical first portion 8, and a rearwardly extending portion 10. The upper arms 4 may also have a downwardly extending end 12 for further retention of the optical device 1 to the monitor. The downwardly extending end 12 in the displayed embodiment is directed downward at an angle A of 45 degrees relative to the rearwardly extending portion 10 of the upper arm. Alternatively, the downwardly extending end 12 may extend in any other declining angle to facilitate retention of the monitor, or may be eliminated completely. When the optical device 1 is installed, the rearwardly extending portion 10 of the upper arm rests on the top of the monitor and the downwardly extending end 12 of the upper arm, when present, extends behind the monitor for further stabilization of the optical device 1. Alternatively, a protective surface 34 made of rubber or another like material may be placed on at least the rearwardly extending portion 10 as well as upon the downwardly extending end 12 to provide a high friction surface for a more secure, yet easily adjustable contact with the monitor 30 and to provide non-marring contact. Other means for increasing the contact between the arms and the monitor may be employed, such as a rubber contact pad on the monitor.

The lower arms 6 are designed to rest against the front side of the monitor 32 in order to adjust the spacing between the optical surface 2 and the monitor 30. The lower arms 6 have a first generally vertical portion 14, a rearwardly extending portion 16, and an end portion 18 which contacts the monitor. In the displayed embodiment, the end portion 18 of each lower arm is upwardly directed and positioned generally perpendicular to the rearwardly extending portion 16 of the lower arm. The end portion 18 of each lower arm may be downward facing or positioned at any other angle relative to the rearwardly extending portion 16 of the lower arm. Rubber or other like materials serving as a bumper/contact surface 36 with the monitor may be placed on the end portion 18 to improve the frictional contact with the monitor. Other contact-increasing means may be employed. For example, the monitor itself may be provided with rubber pads at the points of contact with the end portions.

The upper arms 4 and lower arms 6 each support the optical surface 2 through connectors 20. The connectors 20 have a connector body 22 secured to a frame element 3 of the optical device 1. The connector body 22 extends rearwardly from the frame element 3 and has an arm retainer 24 at its distal end. In the embodiment shown, the arm retainer 24 has a cylindrical shape. The arm retainer 24 may be in a variety of other shapes including, square, trapezoidal, and rectangular. The connector bodies 22 may flare inwardly from the frame 5, allowing an optical surface 2 of extended width to be utilized while allowing the arms 4 and 6 to be generally disposed along the sides of the monitor.

The arm retainer 24 has an aperture 26 through which a first portion 8 or 14 of an upper or lower arm, respectively, extends to attach the arms 4, 6 to the frame 5. A tightening knob 28 is placed over an end of the arm retainer 24 and serves to put pressure onto the arm retainer in order to secure the inserted arm within the arm retainer. In the embodiment displayed, the arm retainer 24 has two opposed vertical slots 25 at its end and its body is tapered inwardly towards the end. The tightening knob 28 has a bore to receive the tapered end of the arm retainer 24. Driving the tightening knob 28 against the tapered end flexes or pinches the retainer against the inserted arm. The tightening knob may be a variety of other shapes and the tightening can be made by other means well known in the art. For instance, the tapered exterior surface of the arm retainer 24 may have threads and the tightening knob 28 is adapted to be screwed onto the threads. The pinch connection between the upper and lower arms 4 and 6 and arm retainers 24 allow the arms to fully maintain their vertical orientation within the arm retainers but permits the user to swivel the arms horizontally around the vertical axis for further adjustment purposes without loosening the tightening knob 28. Alternatively, the connection between the upper and lower arms 4 and 6 and arm retainers 24 may be adapted to lock both vertical and horizontal movement of the upper and lower arms.

A user can easily adjust the vertical height of the upper and lower arms 4, 6 by loosening the tightening knob 28 and sliding the arm's first portion 8, 14 within the arm retainer 24 and re-fastening the tightening knob. Furthermore, the space between the optical surface 1 and the monitor 30 can be adjusted by pivoting the lower arms 6 horizontally. As the end portions 18 of the lower arms are rotated towards the monitor 30, the optical surface 2 is moved away from the monitor. When the end portions 18 of the lower arms are rotated away from the monitor 30 the optical surface 2 is moved closer to the monitor. Accordingly, a user can easily bring the magnifying surface 2 closer to or farther from the monitor and enable the user to increase or decrease the level of magnification when the optical surface 2 comprises a magnifying lens. Furthermore, rotating the lower arms 6 without changing the position of the upper arms can allow the user to adjust the angle of the optical surface 2 relative to the monitor 30. Consequently, a user can position the optical device 1 parallel to the monitor 30 or at another angle as desired or needed.

Having thus described the invention, it should be apparent that many structural adaptations may be implemented without departing from the scope of the present invention as set forth above and as described herein below by the claims.

I claim:

1. An adjustable optical device for a computer monitor having a front face, sides, and a rear face, comprising:
    an optical surface,
    at least one upper arm and at least one front face-contacting movable lower arm coupled to the optical surface,
    said upper arm being adapted to rest upon an upper surface of the monitor for retention of the optical device upon the monitor,
    said movable lower arm being adapted to contact the front face of the monitor, wherein movement of the lower arm adjusts a distance between said optical surface and the monitor and an angle of the optical surface relative to the monitor, and
    locking means for maintaining said lower arms in a desired position to allow the optical surface to be maintained at a desired orientation with respect to the monitor.

2. The adjustable optical device for a computer monitor as set forth in claim 1, wherein connectors couple each of said lower arms to said optical surface, said connectors comprising;
    a connector body and an arm retainer attached to said connector body, said arm retainer having an aperture for receiving a portion of said lower arm, whereby said vertical orientation of said lower arms can be adjusted by sliding said portion of said lower arm within said arm retainer.

3. The adjustable optical device for a computer monitor as set forth in claim 2, wherein said locking means comprises a tightening element mounted on said arm retainer.

4. The adjustable optical device for a computer monitor as set forth in claim 3, wherein said tightening element selectively restricts vertical movement of said arm retained in said arm retainer and permits the user to swivel said arm horizontally for further adjustments.

5. The adjustable optical device for a computer monitor as set forth in claim 3, wherein said tightening element selectively restricts vertical and horizontal movement of said arm.

6. The adjustable optical device for a computer monitor as set forth in claim 3, wherein
said arm retainer has a thread on its exterior surface, and
said tightening element is adapted to screw onto said thread on said arm retainer.

7. The adjustable optical device for a computer monitor as set forth in claim 2 wherein said connector body includes at least one locking facilitating slot to allow locking flexure of a portion of the connector body against the arm.

8. The adjustable optical device for a computer monitor as set forth in claim 3 wherein said connector body is tapered on one end to accommodate the tightening element.

9. The adjustable optical device for a computer monitor as set forth in claim 2, wherein a frame comprising one or more frame elements extends along the periphery of at least one side of said optical surface whereby said frame is adapted to support said optical surface.

10. The adjustable optical device for a computer monitor as set forth in claim 9, wherein said connectors are attached to said frame.

11. The adjustable optical device for a computer monitor as set forth in claim 10, wherein the connector body has a first end coupled to the frame and a second end connected to said arm retainer, the second end being positioned inwardly of the first end with respect to a side edge of the optical surface.

12. The adjustable optical device for a computer monitor as set forth in claim 9, wherein said frame elements comprise first and second frame elements oriented on opposite vertical sides of said optical surface.

13. The adjustable optical device for a computer monitor as set forth in claim 1, wherein said upper arm includes a rearwardly extending portion which extends over the top of the computer monitor for securement of said optical device to the monitor.

14. The adjustable optical device for a computer monitor as set forth in claim 13, wherein said upper arm also includes a rear face-contacting downwardly extending portion which contacts the rear face of the monitor to further secure the optical device to the monitor.

15. The adjustable optical device for a computer monitor as set forth in claim 14, wherein said downwardly extending end extends downward at a decline of 45 degrees.

16. The adjustable optical device for a computer monitor as set forth in claim 1, wherein said movable lower arm also includes a first portion and a rearwardly extending portion.

17. The adjustable optical device for a computer monitor as set forth in claim 1, wherein said movable lower arm swivels horizontally around a vertical axis.

18. The adjustable optical device for a computer monitor as set forth in claim 1, wherein said end of said lower arm extends upward at an angle of 90 degrees.

19. The adjustable optical device for a computer monitor as set forth in claim 1, wherein said optical device has two upper arms and two lower arms.

20. The adjustable optical device for a computer monitor as set forth in claim 1, wherein said optical surface comprises a magnifying lens.

21. The adjustable optical device for a computer monitor as set forth in claim 1, wherein said optical surface comprises a glare filter.

22. The adjustable optical device for a computer monitor as set forth in claim 1, wherein said upper arms are movable.

23. The adjustable optical device for a computer monitor as set forth in claim 22, wherein connectors couple each of said upper arms to said optical surface, said connectors comprising;
a connector body and an arm retainer attached to said connector body, said arm retainer having an aperture for receiving a portion of said upper arm, whereby said vertical orientation of said upper arms can be adjusted by sliding said portion of said upper arm within said arm retainer.

24. A method for mounting an optical device to a computer monitor having a front face, sides, and a rear face, comprising the steps of:
resting at least one upper arm coupled to said optical device on an upper surface of said monitor,
resting an end of at least one lower arm coupled to said optical device upon the front face of the monitor, and
rotating said lower arm in an arc whereby movement of said lower arm adjusts a distance between said optical device and said monitor and an angle of said optical device relative to said monitor.

25. A method for mounting an optical device to a computer monitor as set forth in claim 24, wherein said lower arm is rotated in a horizontal plane around a vertical axis.

\* \* \* \* \*